United States Patent
Ma et al.

(10) Patent No.: US 12,040,823 B2
(45) Date of Patent: Jul. 16, 2024

(54) SIGNAL SENDING CIRCUIT, SIGNAL RECEIVING CIRCUIT, ELECTRONIC APPARATUS, AND BASE STATION

(71) Applicant: HUAWEI TECHNOLOGIES CO., LTD., Guangdong (CN)

(72) Inventors: Chuanhui Ma, Chengdu (CN); Dong Han, Chengdu (CN); Guolong Huang, Chengdu (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 96 days.

(21) Appl. No.: 17/508,662

(22) Filed: Oct. 22, 2021

(65) Prior Publication Data

US 2022/0052715 A1 Feb. 17, 2022

Related U.S. Application Data

(63) Continuation of application No. PCT/CN2020/086766, filed on Apr. 24, 2020.

(30) Foreign Application Priority Data

Apr. 26, 2019 (CN) .......................... 201910354080.3

(51) Int. Cl.
*H04B 1/04* (2006.01)
*H04B 1/00* (2006.01)
(Continued)

(52) U.S. Cl.
CPC ......... *H04B 1/0458* (2013.01); *H04B 1/0007* (2013.01); *H04B 1/0475* (2013.01); *H04B 1/0483* (2013.01); *H04B 2001/0408* (2013.01)

(58) Field of Classification Search
None
See application file for complete search history.

(56) References Cited

U.S. PATENT DOCUMENTS 6,882,311 B2  4/2005  Walker et al.
9,831,933 B1  11/2017 Chieh et al.
(Continued)

FOREIGN PATENT DOCUMENTS

CN  201699698 U  1/2011
CN  203708241 U  7/2014
(Continued)

OTHER PUBLICATIONS

Office Action issued in Chinese Application No. 201910354080.3 on Apr. 30, 2021, 21 pages (with English translation).
(Continued)

*Primary Examiner* — Pablo N Tran
(74) *Attorney, Agent, or Firm* — Fish & Richardson P.C.

(57) ABSTRACT

The present disclosure relates to signal sending circuits, signal receiving circuits, electronic apparatus, and base stations. One example circuit includes a signal pre-processing sub-circuit, a digital-to-analog conversion sub-circuit, an intermediate frequency power splitter, K frequency conversion phase-shift sub-circuits, and K antenna elements. An output end of the signal pre-processing sub-circuit is connected to an input end of the digital-to-analog conversion sub-circuit, an output end of the digital-to-analog conversion sub-circuit is connected to an input end of the intermediate frequency power splitter, an output end of the intermediate frequency power splitter is connected to input ends of the K frequency conversion phase-shift sub-circuits, and output ends of the K frequency conversion phase-shift sub-circuits are connected one-to-one to input ends of the K antenna elements.

14 Claims, 11 Drawing Sheets

(51) Int. Cl.
  *H04W 28/18* (2009.01)
  *H04W 88/10* (2009.01)

(56) References Cited

U.S. PATENT DOCUMENTS

| | | | |
|---|---|---|---|
| 2002/0171584 | A1 | 11/2002 | Walker et al. |
| 2010/0136927 | A1* | 6/2010 | Rofougaran ............. H04B 1/16 |
| | | | 455/142 |
| 2013/0301619 | A1* | 11/2013 | Singh ................ H04W 56/0045 |
| | | | 370/336 |
| 2015/0147987 | A1 | 5/2015 | Harris et al. |
| 2017/0019847 | A1 | 1/2017 | Han et al. |
| 2021/0159594 | A1* | 5/2021 | Tiebout .................. H01Q 5/385 |
| 2022/0131575 | A1* | 4/2022 | Zhou ...................... H04B 7/088 |
| 2023/0155656 | A1* | 5/2023 | Raghavan ............. H04B 7/043 |
| | | | 375/262 |

FOREIGN PATENT DOCUMENTS

| | | |
|---|---|---|
| CN | 105874719 A | 8/2016 |
| CN | 108418611 A | 8/2018 |
| CN | 108880638 A | 11/2018 |
| CN | 109167613 A | 1/2019 |
| CN | 109379101 A | 2/2019 |
| EP | 3094005 A1 | 11/2016 |
| WO | 2015149219 A1 | 10/2015 |

OTHER PUBLICATIONS

PCT International Search Report and Written Opinion issued in International Application No. PCT/CN2020/086766 on Jul. 6, 2020, 17 pages (with English translation).
Extended European Search Report issued in European Application No. 20794296.2 on May 3, 2022, 9 pages.

* cited by examiner

SIGNAL SENDING CIRCUIT, SIGNAL RECEIVING CIRCUIT, ELECTRONIC APPARATUS, AND BASE STATION

CROSS-REFERENCE TO RELATED APPLICATIONS

This application is a continuation of International Application No. PCT/CN2020/086766, filed on Apr. 24, 2020, which claims priority to Chinese Patent Application No. 201910354080.3, filed on Apr. 26, 2019. The disclosures of the aforementioned applications are hereby incorporated by reference in their entireties.

TECHNICAL FIELD

The present invention relates to the field of signal processing technologies, and in particular, to a signal sending circuit, a signal receiving circuit, an electronic apparatus, and a base station.

BACKGROUND

An array beamforming, technology implements an expected signal superposition feature by using correlation between signals received or sent by a plurality of antenna elements, to aggregate power of a transmitted signal, suppress receiving and sending interference, and improve a received signal-to-noise indicator, thereby increasing an overall capacity of a communication system. Therefore, the array beamforming technology has become one of key technologies of 5th generation (5G) mobile communication, and is applicable to two frequency bands: a low frequency band (sub-6 GHz) and a millimeter wave frequency band, where the two frequency bands are respectively used to reduce low-frequency interference and improve millimeter wave coverage.

In addition to limiting factors such as interference, a beam gain, and beam power, a quantity of independent beams in a specific communication system using the beamforming technology also limits a capacity of the communication system. The independent beams are a quantity of beams whose beam directions and widths can be independently adjusted and controlled at a same moment. A larger quantity of independent beams in the communication system indicates a larger quantity of users who can be served at a same moment, and therefore indicates a larger overall capacity of the system. Therefore, compared only from a dimension of a quantity of independent beams, a capacity of a multi-beam communication system is higher than that of a single-beam communication system.

However, a quantity of independent beams in an existing multi-beam architecture, for example, a digital beamforming (Digital Beamforming, DBF) architecture and a hybrid beamforming. (Hybrid Beamforming) architecture, does not exceed a quantity of intermediate radio frequency channels in the multi-beam architecture. This may be understood as that the quantity of independent beams does not exceed a quantity of transmit antenna array elements. In an existing solution, a capacity of a communication system is increased by increasing a quantity of independent beams, and a quantity of intermediate radio frequency channels needs to be increased in an equal proportion. Consequently, costs of the communication system increase.

SUMMARY

Embodiments of this application provide a signal sending circuit, a signal receiving circuit, an electronic apparatus, and a base station, to avoid increasing a quantity of intermediate radio frequency channels when a capacity of a communication system is increased by increasing a quantity of independent beams. This can reduce costs of the communication system to some extent.

According to a first aspect, an embodiment of this application provides a signal sending circuit, where the signal sending circuit includes a signal pre-processing sub-circuit, a digital-to-analog conversion sub-circuit, an intermediate frequency power splitter, K frequency conversion phase-shift sub-circuits, and K antenna elements, where an output end of the signal pre-processing sub-circuit is connected to an input end of the digital-to-analog conversion sub-circuit, an output end of the digital-to-analog conversion sub-circuit is connected to an input end of the intermediate frequency power splitter, an output end of the intermediate frequency power splitter is connected to input ends of the K frequency conversion phase-shift sub-circuits, output ends of the K frequency conversion phase-shift sub-circuits are connected one-to-one to input ends of the K antenna elements, and K is a positive integer.

The signal pre-processing sub-circuit is configured to perform frequency conversion on N to-be-sent signals to obtain N digital intermediate frequency signals, and send the N digital intermediate frequency signals to the digital-to-analog conversion sub-circuit, where N is a positive integer.

The digital-to-analog conversion sub-circuit is configured to perform conversion on the N digital intermediate frequency signals to obtain one first analog intermediate frequency signal, and send the first analog intermediate frequency signal to the intermediate frequency power splitter.

The intermediate frequency power splitter is configured to split the first analog intermediate frequency signal into K second analog intermediate frequency signals, and separately send the K second analog intermediate frequency signals to the K frequency conversion phase-shift sub-circuits.

A frequency conversion phase-shill sub-circuit i in the K frequency conversion phase-shift sub-circuits is configured to: receive a local oscillator signal group, perform, by using a target phase weighted value set and the local oscillator signal group, frequency conversion and phase shift on a received second analog intermediate frequency signal to obtain N radio frequency signals, and send the N radio frequency signals to an antenna element i, where the frequency conversion phase-shift sub-circuit i is any one of the K frequency conversion phase-shift sub-circuits, the antenna element i is an antenna element correspondingly connected to the frequency conversion phase-shift sub-circuit i, and i is a positive integer.

The antenna element i is configured to send the received N radio frequency signals.

When N signals are sent, independent beams are sent by using K intermediate radio frequency channels, where N may be any positive integer. In this case, N may be greater than K, so that a quantity of the independent beams may be greater than a quantity of the intermediate radio frequency channels. As K is a fixed value after a communication system is designed, compared with an existing solution in which N can only be less than or equal to K, this solution in this embodiment can avoid increasing the quantity of the intermediate radio frequency channels when the quantity of the independent beams is increased. This can reduce costs of the communication system to some extent.

Further, the signal pre-processing sub-circuit is specifically configured to:
perform frequency conversion on the N to-be-sent signals by using a frequency division method, to obtain the N digital intermediate frequency signals; or
perform frequency conversion on the N to-be-sent signals by using an orthogonal method, to obtain the N digital intermediate frequency signals, where N is 2; or
perform frequency conversion on the N to-be-sent signals by using an orthogonal method and a frequency division method, to obtain the N digital intermediate frequency signals.

In a possible embodiment, the target phase weighted value set includes N phase weighted values, the local oscillator signal group includes N local oscillator signals, and the frequency conversion phase-shift sub-circuit is specifically configured to:
perform phase weighting on the N local oscillator signals in the local oscillator signal group by using the N phase weighted values, to obtain a weighted local oscillator signal group, where the N phase weighted values correspond one-to-one to the N local oscillator signals; and
perform frequency mixing on the received second analog intermediate frequency signal by using the weighted local oscillator signal group, to obtain the N radio frequency signals.

In a possible embodiment, the digital-to-analog conversion sub-circuit includes one DAC.

Alternatively, the digital-to-analog conversion sub-circuit includes M DACs and a combiner, input ends of the M DACs are all connected to the input end of the digital-to-analog conversion sub-circuit, output ends of the M DACs are all connected to an input end of the combiner, an output end of the combiner is the output end of the digital-to-analog conversion sub-circuit, and M is a positive integer greater than 1 and less than or equal to N.

The digital-to-analog conversion sub-circuit includes one DAC or M DACs. That is, a quantity of the DACs may be less than the quantity N of the independent beams. Compared with an existing solution in which a quantity of DACs can only be greater than or equal to a quantity of independent beams, this solution in this embodiment can reduce costs of the communication system to some extent. If one DAC is used, at least N−1 DACs are reduced in the communication system, so that costs of the at least N−1 DACs are reduced. In this way, an effect in cost reduction is best achieved.

In a possible embodiment, the target phase weighted value set includes two phase weighted values, the local oscillator signal group includes two local oscillator signals, and the frequency conversion phase-shift sub-circuit is specifically configured to:
perform phase weighting on N local oscillator signals in the local oscillator signal group by using the two phase weighted values, to obtain a weighted local oscillator signal group, where the two phase weighted values correspond one-to-one to the two local oscillator signals; and
perform frequency mixing on the received second analog intermediate frequency signal by using the weighted local oscillator signal group, to obtain two radio frequency signals.

Two independent beams may be sent, and there is no need to send a plurality of intermediate frequency signals in a frequency division manner when the independent beams are sent, so that a bandwidth of an intermediate frequency circuit and outband suppression requirements of various filters in the circuit are reduced.

In a possible embodiment, N is a positive even number, and for the performing frequency conversion on the N to-be-sent signals by using an orthogonal method and a frequency division method, to obtain the N digital intermediate frequency signals, the signal pre-processing sub-circuit is specifically configured to:
perform frequency conversion on the N to-be-sent signals by using the frequency division method, to obtain N reference digital intermediate frequency signals;
group the N reference digital intermediate frequency signals in pairs to obtain N/2 signal groups; and
process the N/2 signal groups by using the orthogonal method, to obtain the N digital intermediate frequency signals.

Further, the target phase weighted value set includes N phase weighted values, the local oscillator signal group includes N local oscillator signals, and the frequency conversion phase-shift sub-circuit is specifically configured to:
perform phase weighting on the N local oscillator signals in the local oscillator signal group by using the N phase weighted values, to obtain a weighted local oscillator signal group, where the N phase weighted values correspond one-to-one to the N local oscillator signals; and
perform frequency mixing on the received second analog intermediate frequency signal by using the weighted local oscillator signal group, to obtain the N radio frequency signals.

Based on a combination of an orthogonal dimension and a frequency division dimension, a plurality of independent beams may be transmitted. In addition, a bandwidth used during modulation may be greatly reduced during intermediate frequency conversion, so that a spectrum resource can be reduced to some extent, thereby improving, to some extent, a capacity of the communication system in which the signal sending circuit is located.

In a possible embodiment, the frequency conversion phase-shift sub-circuit includes a frequency mixer and a switch circuit, and the switch circuit is configured to control connection and disconnection of an input port of the frequency mixer.

On/off of each local oscillator signal is controlled, so that dynamic mapping between a to-be-sent/to-be-received signal and an antenna array element can be implemented, thereby improving flexibility of the signal sending circuit.

According to a second aspect, an embodiment of this application provides a signal receiving circuit, where the circuit includes a signal post-processing sub-circuit, an analog-to-digital conversion sub-circuit, an intermediate frequency combiner, K frequency conversion phase-shift sub-circuits, and K antenna elements, where output ends of the K antenna elements are connected one-to-one to input ends of the K frequency conversion phase-shift sub-circuits, output ends of the K frequency conversion phase-shift sub-circuits are all connected to an input end of the intermediate frequency combiner, an output end of the intermediate frequency combiner is connected to an input end of the analog-to-digital conversion sub-circuit, an output end of the analog-to-digital conversion sub-circuit is connected to an input end of the signal post-processing sub-circuit, and K is a positive integer.

An antenna element i in the K antenna elements is configured to receive N radio frequency signals, and send the N radio frequency signals to a frequency conversion phase-shift sub-circuit i, where the antenna element i is any one of the K antenna elements, the frequency conversion phase-shift sub-circuit i is a frequency conversion phase-shift sub-circuit correspondingly connected to the antenna element i, and N and i are positive integers.

The frequency conversion phase-shift sub-circuit i is configured to: receive a local oscillator signal group, perform frequency conversion on the received N radio frequency signals by using a preset frequency conversion and phase shift method, a target phase weighted value set, and the local oscillator signal group to obtain N third analog intermediate frequency signals, and send the N third analog intermediate frequency signals to the intermediate frequency combiner.

The intermediate frequency combiner is configured to combine N third analog intermediate frequency signals sent by each frequency conversion phase-shift sub-circuit to obtain one fourth analog intermediate frequency signal, and send the fourth analog intermediate frequency signal to the analog-to-digital conversion sub-circuit.

The analog-to-digital conversion sub-circuit is configured to perform analog-to-digital conversion on the fourth analog intermediate frequency signal to obtain one first digital intermediate frequency signal, and send the first digital intermediate frequency signal to the signal post-processing sub-circuit.

The signal post-processing sub-circuit is configured to perform filtering on the first digital intermediate frequency signal to obtain N second digital intermediate frequency signals, perform frequency conversion on the N second digital intermediate frequency signals to obtain N low-frequency signals, and output the N low-frequency signals.

In a possible embodiment, the target phase weighted value set includes N phase weighted values, the local oscillator signal group includes N local oscillator signals, and the frequency conversion phase-shift sub-circuit is specifically configured to:

perform phase weighting on the N local oscillator signals in the local oscillator signal group by using the N phase weighted values, to obtain a weighted local oscillator signal group, where the N phase weighted values correspond one-to-one to the N local oscillator signals; and perform down conversion on the N radio frequency signals by using the weighted local oscillator signal group, to obtain N third analog intermediate frequency signals.

In a possible embodiment, the analog-to-digital conversion sub-circuit includes one ADC.

Alternatively, the analog-to-digital conversion sub-circuit includes H ADCs and a splitter, input ends of the H ADCs are all connected to the input end of the analog-to-digital conversion sub-circuit, output ends of the 14 ADCs are all connected to an input end of the splitter, an output end of the splitter is the output end of the analog-to-digital conversion sub-circuit, and H is a positive integer greater than 1 and less than or equal to N.

In a possible embodiment, the frequency conversion phase-shift, sub-circuit includes a frequency mixer and a switch circuit, and the switch circuit is configured to control connection and disconnection of an input port of the frequency mixer.

According to a third aspect, an embodiment of this application provides an electronic device. The electronic device includes the circuits according to the first aspect and the second aspect.

According to a fourth aspect, an embodiment of this application provides a base station, where the base station includes the circuits according to the first aspect and the second aspect.

These aspects or other aspects of the present invention are clearer and more comprehensible in description of the following embodiments.

BRIEF DESCRIPTION OF DRAWINGS

To describe the technical solutions in the embodiments of the present invention more clearly, the following briefly describes the accompanying drawings used in describing the embodiments. It is clearly that the accompanying drawings in the following description show merely some embodiments of the present invention, and a person of ordinary skill in the art may derive other drawings from these accompanying drawings without creative efforts.

DESCRIPTION OF EMBODIMENTS

The following describes embodiments of this Application with reference to accompanying drawings.

The following specifically describes specific structures of a signal sending circuit and a signal receiving circuit According to the signal sending circuit in this application, when a quantity of independent beams increases, a quantity of intermediate radio frequency channels does not need to be correspondingly increased. Therefore, a capacity of a communication system may be improved without increasing costs and the volume of the communication system.

Figure 1A:
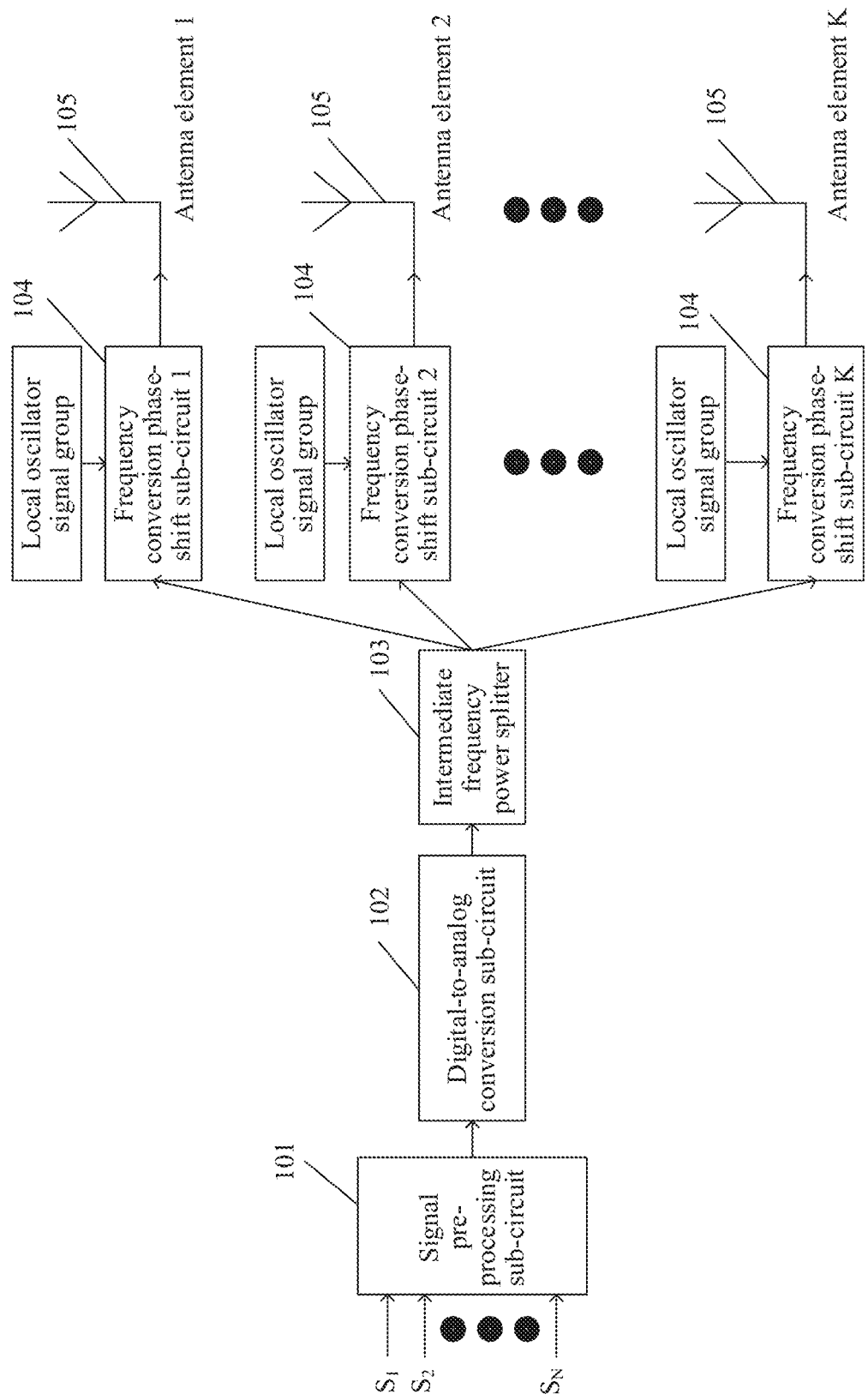
FIG. 1A is a schematic structural diagram of a signal sending circuit according to an embodiment of this application.

FIG. 1A is a schematic structural diagram of a signal sending circuit according to an embodiment of this application. As shown in FIG. 1A, the signal sending circuit includes a signal pre-processing sub-circuit 101, a digital-to-analog conversion sub-circuit 102, an intermediate frequency power splitter 103, K frequency conversion phase-shift sub-circuits 104, and K antenna elements 105. An output end of the signal pre-processing sub-circuit 101 is connected to an input end of the digital-to-analog conversion sub-circuit 102 an output end of the digital-to-analog conversion sub-circuit 102 is connected to an input end of the intermediate frequency power splitter 103, an output end of the intermediate frequency power splitter 103 is connected to input ends of the K frequency conversion phase-shift sub-circuits 104, output ends of the K frequency conversion phase-shift sub-circuits 104 are connected one-to-one to input ends of the K antenna elements 105, and k is a positive integer.

The signal pre-processing sub-circuit 101 is configured to perform frequency conversion on N to-be-sent signals to obtain N digital intermediate frequency signals, and send the N digital intermediate frequency signals to the digital-to-analog conversion sub-circuit 102, where N is a positive integer.

The digital-to-analog conversion sub-circuit 102 is configured to perform conversion on the N digital intermediate frequency signals to obtain one first analog intermediate frequency signal, and send the first analog intermediate frequency signal to the intermediate frequency power splitter 103.

The intermediate frequency power splitter 103 is configured to split the first analog intermediate frequency signal into K second analog intermediate frequency signals, and separately said the K second analog intermediate frequency signals to the K frequency conversion phase-shift sub-circuits 104.

A frequency conversion phase-shift sub-circuit i in the K frequency conversion phase-shift sub-circuits 104 is configured to: receive a local oscillator signal group, perform, by using a target phase weighted value set and the local oscillator signal group, frequency conversion and phase shift on a received second analog intermediate frequency signal to obtain N radio frequency signals, and send the N radio frequency signals to an antenna element i, where the frequency conversion phase-shift sub-circuit i is any one of the K frequency conversion phase-shift sub-circuits 104, the antenna element i is an antenna element correspondingly connected to the frequency conversion phase-shift sub-circuit i, and i is a positive integer.

The antenna element i is configured to send the received N radio frequency signals.

A method in which the signal pre-processing sub-circuit 101 performs frequency conversion on the N to-be-sent signals may be one of the following: a frequency division method, an orthogonal method, and an orthogonal method and a frequency division method.

Optionally, that the signal pre-processing sub-circuit 101 performs frequency conversion on the N to-be-sent signals may be specifically:

performing frequency conversion on the N to-be-sent signals by using the frequency division method to obtain the N digital intermediate frequency signals; or performing frequency conversion on the N to-be-sent signals by using the orthogonal method to obtain the N digital intermediate frequency signals, where N is 2; or performing frequency conversion on the N to-be-sent signals by using the orthogonal method and the frequency division method to obtain the N digital intermediate frequency signals.

Optionally, when the signal pre-processing sub-circuit 101 performs frequency conversion on the N to-be-sent signals by using the frequency division method, the frequency conversion may be specifically performed by using the following method:

The N to-be-sent signals are denoted as $S_1, S_2, \ldots,$ and $S_N$. When frequency conversion is performed on the signals $S_1$ and $S_2$ to $S_N$, $S_1$ and $S_2$ to $S_N$ are respectively multiplied by corresponding intermediate frequency signals, and then filtering is performed, to obtain the N digital intermediate frequency signals. The N digital intermediate frequency signals are denoted as $S_{IF1}, S_{IF2}, \ldots, S_{IFN}$. Intermediate frequencies corresponding to the N to-be-sent signals may be represented by $f_{IF1}, f_{IF2}, \ldots, f_{IFN}$. The to-be-sent signals may correspond to the intermediate frequencies according to the following correspondence rule: $f_{IF1}$ corresponds to $S_1$, $f_{IF2}$ corresponds to $S_2, \ldots,$ and $f_{IFN}$ corresponds to $S_N$. A possible correspondence method between the N digital intermediate frequency signals and the N to-be-sent signals is as follows: $S_{IF1}$ is a digital intermediate frequency signal obtained after frequency conversion is performed on $S_1$, $S_{IF2}$ is a digital intermediate frequency signal obtained after frequency conversion is performed on $S_2, \ldots,$ and $S_{IFN}$ is a digital intermediate frequency signal obtained after frequency conversion is performed on $S_N$. This is merely an example for description, and no limitation is specifically imposed.

Optionally, when the signal pre-processing sub-circuit 101 performs frequency conversion on two to-be-sent signals by using the orthogonal method, the frequency conversion may be specifically performed by using the following method:

The to-be-sent signals are denoted as $S_1$ and $S_2$, and frequencies of the $S_1$ and $S_2$ are converted to intermediate frequencies $f_{IF1}$ and $f_{IF1}+\Delta f$, to obtain reference digital intermediate frequency signals $S_{IF1}$ and $S_{IF2}$, where $\Delta f$ may be a minimum value that approaches 0 and is not equal to 0. The reference digital intermediate frequency signals $S_{IF1}$ and $S_{IF2}$ are combined according to the following rule to obtain a signal I and a signal Q:

If $S_{IF1}$ is located on a real/imaginary axis, $S_{IF2}$ is located on the imaginary/real axis. In the two signals, namely, the signal I and the signal Q, signs of $S_{IF1}$ are the same/opposite, and signs of $S_{IF2}$ are opposite/the same. That is, when the signs of $S_{IF1}$ are the same, the signs of $S_{IF2}$ are opposite. Alternatively, when the signs of Sin are opposite, the signs of $S_{IF2}$ are the same. A possible manner of combination is: $I=S_1-j\times S_2$, and $Q=S_1+j\times S_2$. The signal I and the signal Q are signals obtained after processing is performed by using the orthogonal method.

Optionally, when the intermediate frequency power splitter 103 splits the first analog intermediate frequency signal into the K second analog intermediate frequency signals, power of the second analog intermediate frequency signals is the same as power of the first analog intermediate frequency signal, or the power of the second analog intermediate frequency signals may be different from the power of the first analog intermediate frequency signal.

Optionally, the local oscillator signal group may include N local oscillator signals, where N is any integer greater than 2, or there may be two local oscillator signals.

Optionally, the frequency conversion phase-shift sub-circuit 104 includes a frequency mixer and a switch circuit, and the switch circuit is configured to control connection and disconnection of an input port of the frequency mixer.

In a possible embodiment, the digital-to-analog conversion sub-circuit includes one digital-to-analog converter (Digital-to-analog converter, DAC), or the digital-to-analog conversion sub-circuit may include M DACs and a combiner. Input ends of the M DACs are all connected to the input end of the digital-to-analog conversion sub-circuit, output ends of the M DACs are all connected to an input end of the combiner, and an output end of the combiner is the output end of the digital-to-analog conversion sub-circuit, where M is a positive integer greater than 1 and less than or equal to N.

In this example, the digital-to-analog conversion sub-circuit includes one DAC or M DACs. That is, a quantity of the DACs may be less than a quantity N of independent beams. Compared with an existing solution in which a quantity of DACs can only be greater than or equal to a quantity of independent beams, this solution in this embodiment can reduce costs of a communication system to some extent. If one DAC is used, at least N−1 DACs are reduced in the communication system, so that costs of the at least N−1 DACs are reduced. In this way, an effect in cost reduction is best achieved.

In a possible embodiment, after the signal pre-processing sub-circuit 101 performs frequency conversion on the N to-be-sent signals by using the frequency division method, the target phase weighted value set includes N phase weighted values. When the frequency conversion phase-shift sub-circuit 104 performs frequency conversion and phase shift on the second analog intermediate frequency signal, steps A1 and A2 may be included, which are specifically as follows:

A1. Perform phase weighting on the N local oscillator signals in the local oscillator signal group by using the N phase weighted values to obtain a weighted local oscillator signal group, where the N phase weighted values correspond one-to-one to the N local oscillator signals.

A2. Perform frequency mixing on the received second analog intermediate frequency signal by using the weighted local oscillator signal group to obtain the N radio frequency signals.

Optionally, the local oscillator signals in the local oscillator signal group are denoted as $LO_1, LO_2, \ldots,$ and $LO_N$, and the phase weighted values in the target phase weighted value set are denoted as: $\phi_1, \phi_2, \ldots,$ and $\phi_N$, where a one-to-one correspondence may be implemented by using a corner mark. A local oscillator signal and a phase weighted value that have a same corner mark correspond to each other example, $LO_1$ corresponds to $\phi_1$. Phase weighting may be understood as performing, by using a phase weighted value, phase-shift on a local oscillator signal corresponding to the phase weighted value, where an offset is the phase weighted value. Certainly, another corresponding manner may alternatively be used. This is not specifically limited herein.

Optionally, when frequency mixing is performed on the second analog intermediate frequency signal by using the weighted local oscillator signal group, the frequency mixer is configured to perform frequency mixing on the second analog intermediate frequency signal by using all local oscillator signals in the weighted local oscillator signal group to obtain a mixed signal. Then, frequency selection is performed on the mixed signal based on a frequency selection characteristic of the frequency mixer to obtain the N radio frequency signals. The following formulas need to be satisfied during the frequency mixing: $f_{IF1}+/-LO_1=f_C$, $f_{IF2}+/-LO_2=f_C, \ldots,$ and $f_{IFN}+/-LO_N=f_C$, where $f_C$ is a frequency of a carrier signal, and $LO_1, LO_2, \ldots,$ and $LO_N$ are frequencies of the local oscillator signals.

Figure 1B:
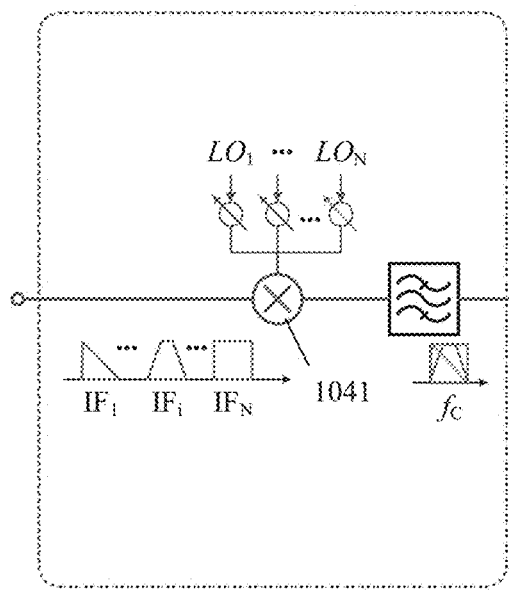
FIG. 1B(a) and FIG. 1B(b) are a schematic structural diagram of a frequency conversion phase-shift sub-circuit according to an embodiment of this application.
Figure 1B:
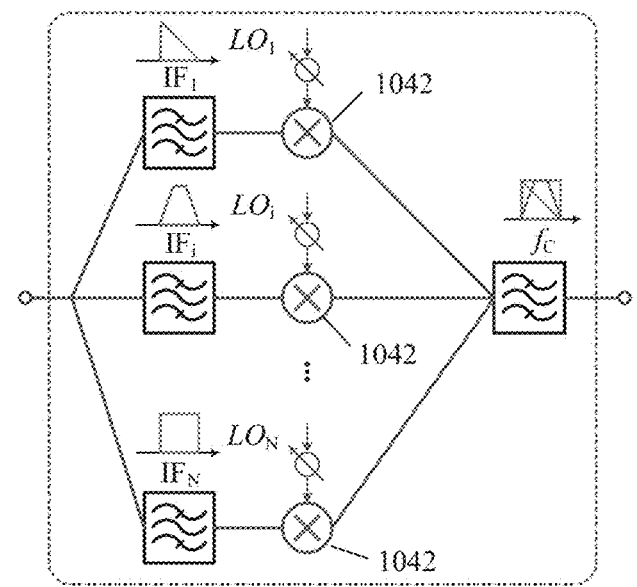

In a possible embodiment, the frequency conversion phase-shift sub-circuit includes one frequency mixer, or the frequency conversion phase-shift sub-circuit includes N frequency mixers. For details, refer to FIG. 1B(a) and FIG. 1B(b). FIG. 1B(a) is a schematic diagram of a frequency conversion phase-shift sub-circuit including one frequency mixer, and FIG. 1B(b) is a schematic diagram of a frequency conversion phase-shift sub-circuit including N frequency mixers.

In this embodiment, when N signals are sent, independent beams are sent by using K intermediate radio frequency channels, where N may be any positive integer. In this case, N may be greater than K, so that a quantity of the independent beams may be greater than a quantity of the intermediate radio frequency channels. As K is a fixed value after the communication system is designed, compared with an existing solution in which N can only be less than or equal to K, this solution in this embodiment can avoid increasing the quantity of the intermediate radio frequency channels when the quantity of the independent beams is increased. This can reduce costs of the communication system to some extent. In addition, the quantity of the independent beams may be increased because a quantity of N may be increased, and the quantity of the intermediate radio frequency channels does not need to be increased, thereby increasing, to some extent, a system capacity of the communication system in which the signal sending circuit is located. Each to-be-transmitted signal may obtain a beam gain of an entire antenna aperture because a full-connection manner is used.

Figure 2:
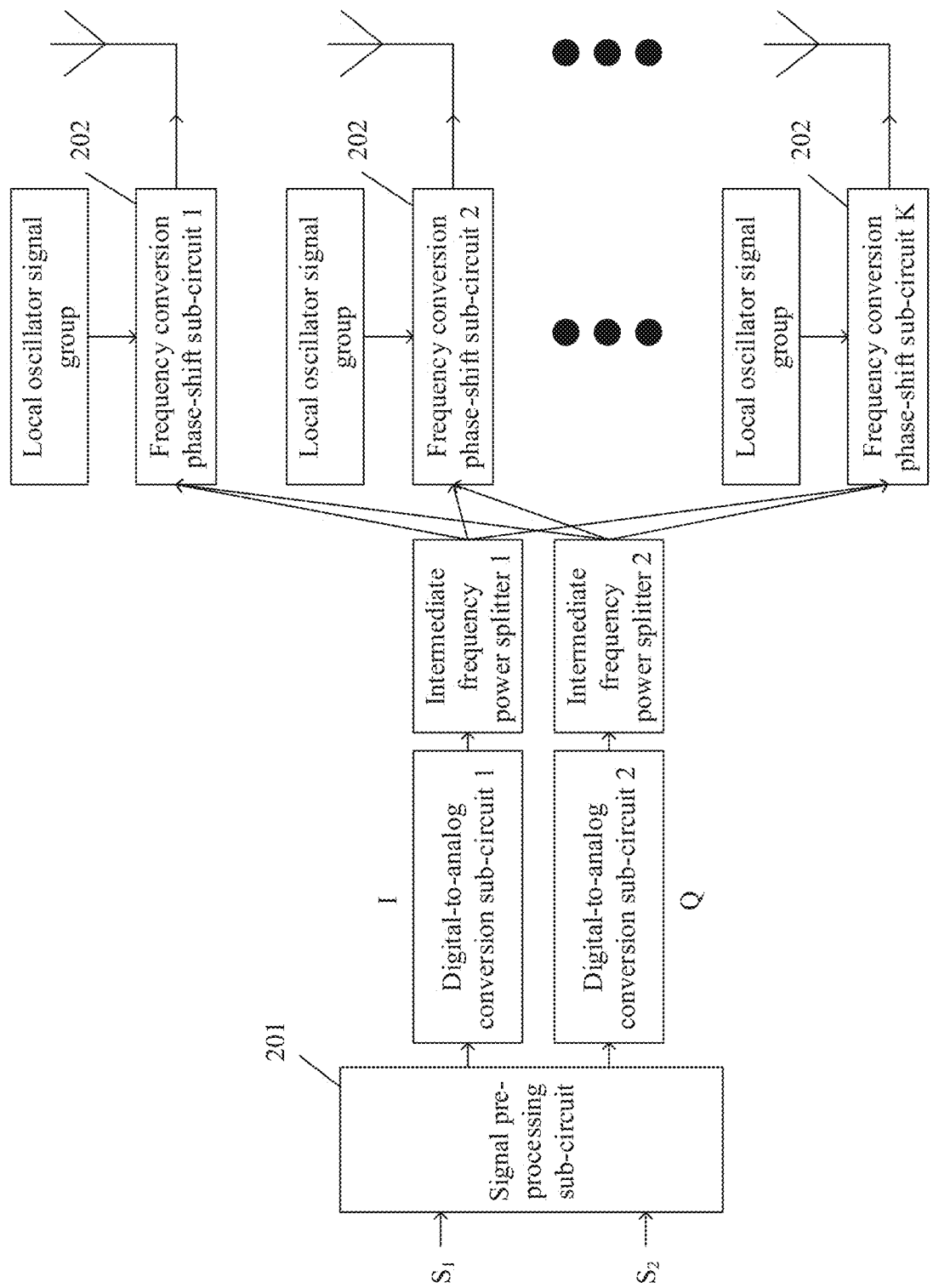
FIG. 2 is a schematic structural diagram of another signal sending circuit according to an embodiment of this application.

FIG. 2 is a schematic structural diagram of another signal sending circuit according to an embodiment of this application. As shown in FIG. 2, for a specific disposition manner of the signal sending circuit, refer to the signal sending circuit shown in FIG. 1A.

In a possible embodiment, after a signal pre-processing sub-circuit 201 performs frequency conversion on N to-be-sent signals by using an orthogonal method, a target phase weighted value set includes two phase weighted values, and a local oscillator signal group includes two local oscillator signals. When performing frequency conversion and phase shift on a second analog intermediate frequency signal, a frequency conversion phase-shift sub-circuit 202 may be configured to perform the following steps B1 and B2 that are specifically as follows:

B1. Perform phase weighting on N local oscillator signals in the local oscillator signal group by using the two phase weighted values to obtain a weighted local oscillator signal group, where the two phase weighted values correspond one-to-one to the two local oscillator signals.

B2. Perform frequency mixing on the received second analog intermediate frequency signal by using the weighted local oscillator signal group to obtain two radio frequency signals.

Optionally, for a specific implementation method for step B1, refer to the method in step A1, and for a specific implementation method for step B2, refer to the method in step A2. Details are not described herein again.

In this embodiment, the orthogonal method is used to send two independent beams, and there is no need to send a plurality of intermediate frequency signals in a frequency division manner when the independent beams are sent, so that a bandwidth of an intermediate frequency circuit and outband suppression requirements of various filters in the circuit are reduced.

Figure 3:
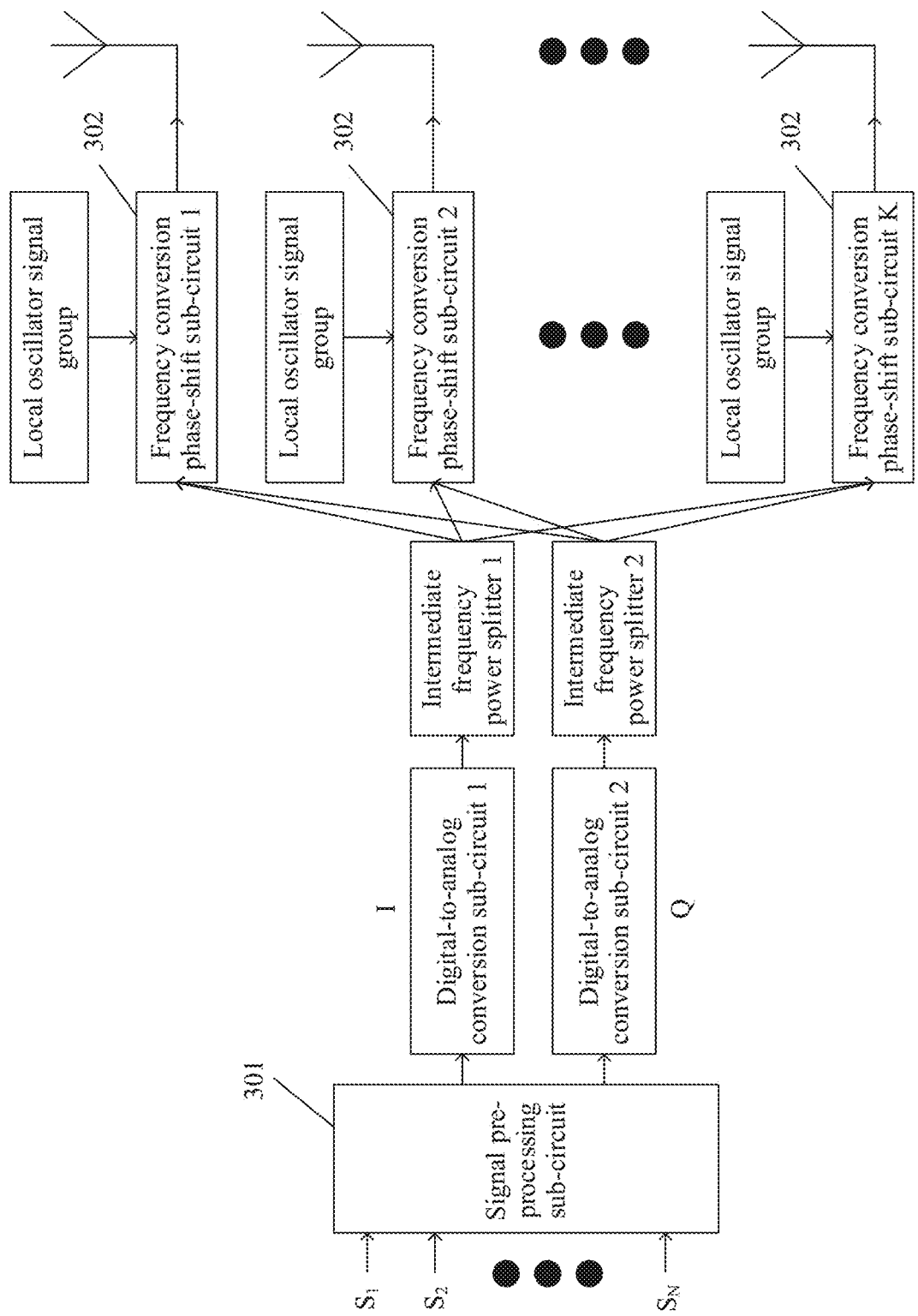
FIG. 3 is a schematic structural diagram of another signal sending circuit according to an embodiment of this application.

FIG. 3 is a schematic structural diagram of another signal sending circuit according to an embodiment of this application. As shown in FIG. 3, when a signal pre-processing sub-circuit 301 performs frequency conversion on N to-be-sent signals by using an orthogonal method and a frequency division method, the following method may be used for frequency conversion, and the method may include steps C1 to C3 that are specifically as follows:

C1. Perform frequency conversion on the N to-be-sent signals by using the frequency division method to obtain N reference digital intermediate frequency signals.

C2. Group the N reference digital intermediate frequency signals in pairs to obtain N/2 signal groups.

C3. Process the N/2 signal groups by using the orthogonal method to obtain N digital intermediate frequency signals.

When frequency conversion is performed on the N to-be-sent signals by using the frequency division method, used intermediate frequencies may be $f_{IF1}$, $f_{IF1}+\Delta f$, $f_{IF2}$, ..., $f_{IFN/2}$, and $f_{IFN/2}+\Delta f$, where $\Delta f$ is a minimum value that approaches 0 and is not equal to 0. During signal processing, $f_{IF1}$ and $f_{IF1}+\Delta f$ may be equivalent. That is, $f_{IF1}$ and $f_{IF1}+\Delta f$ may be considered as a same frequency. In this way, all frequencies with $\Delta f$ are equivalent to corresponding intermediate frequencies.

Optionally, when the N reference digital intermediate frequency signals are grouped, the N to-be-sent signals are denoted as $S_1$, $S_2$, ..., and $S_N$, and the N reference digital intermediate frequency signals are denoted as $S_{IF1}$, $S_{IF2}$, ..., and $S_{IFN}$. A possible grouping manner may be $(S_{IF1}, S_{IF2})$, $(S_{IF3}, S_{IF4})$, ..., and $(S_{IFN-1}, S_{IFN})$.

It should be noted that there is no execution sequence between step C1, and steps C2 and C3, and C1 may be performed before C2 and C3, or C1 may be performed after C2 and C3.

Optionally, for a specific implementation method for step C1, refer to the specific implementation method for the foregoing frequency division method, and for a specific implementation method for step C3, refer to the specific implementation method for the foregoing orthogonal method.

Further, after the signal pre-processing sub-circuit 301 performs frequency conversion on the N to-be-sent signals by using the orthogonal method and the frequency division method, a target phase weighted value set includes N phase weighted values, and a local oscillator signal group includes N local oscillator signals. When performing frequency conversion and phase shift on a second analog intermediate frequency signal, a frequency conversion phase-shift sub-circuit 302 may be configured to perform the following steps D1 and D2 that are specifically as follows:

D1. Perform phase weighting on the N local oscillator signals in the local oscillator signal group by using the N phase weighted values to obtain a weighted local oscillator signal group, where the N phase weighted values correspond one-to-one to the N local oscillator signals.

D2. Perform frequency mixing on the received second analog intermediate frequency signal by using the weighted local oscillator signal group to obtain N radio frequency signals.

Optionally, for a specific implementation method for step D1, refer to the method in step A1, and for a specific implementation method for step D2, refer to the method in step A2. Details are not described herein again.

In this embodiment, based on a combination of an orthogonal dimension and a frequency division dimension, a plurality of independent beams may be transmitted by using two IACs. In addition, because $\Delta f$ approaches 0 during intermediate frequency conversion, a bandwidth used during modulation may be greatly reduced for broadband application, so that a spectrum resource can be reduced to some extent, thereby improving, to some extent, a capacity of a communication system in which the signal sending circuit is located.

Figure 4:
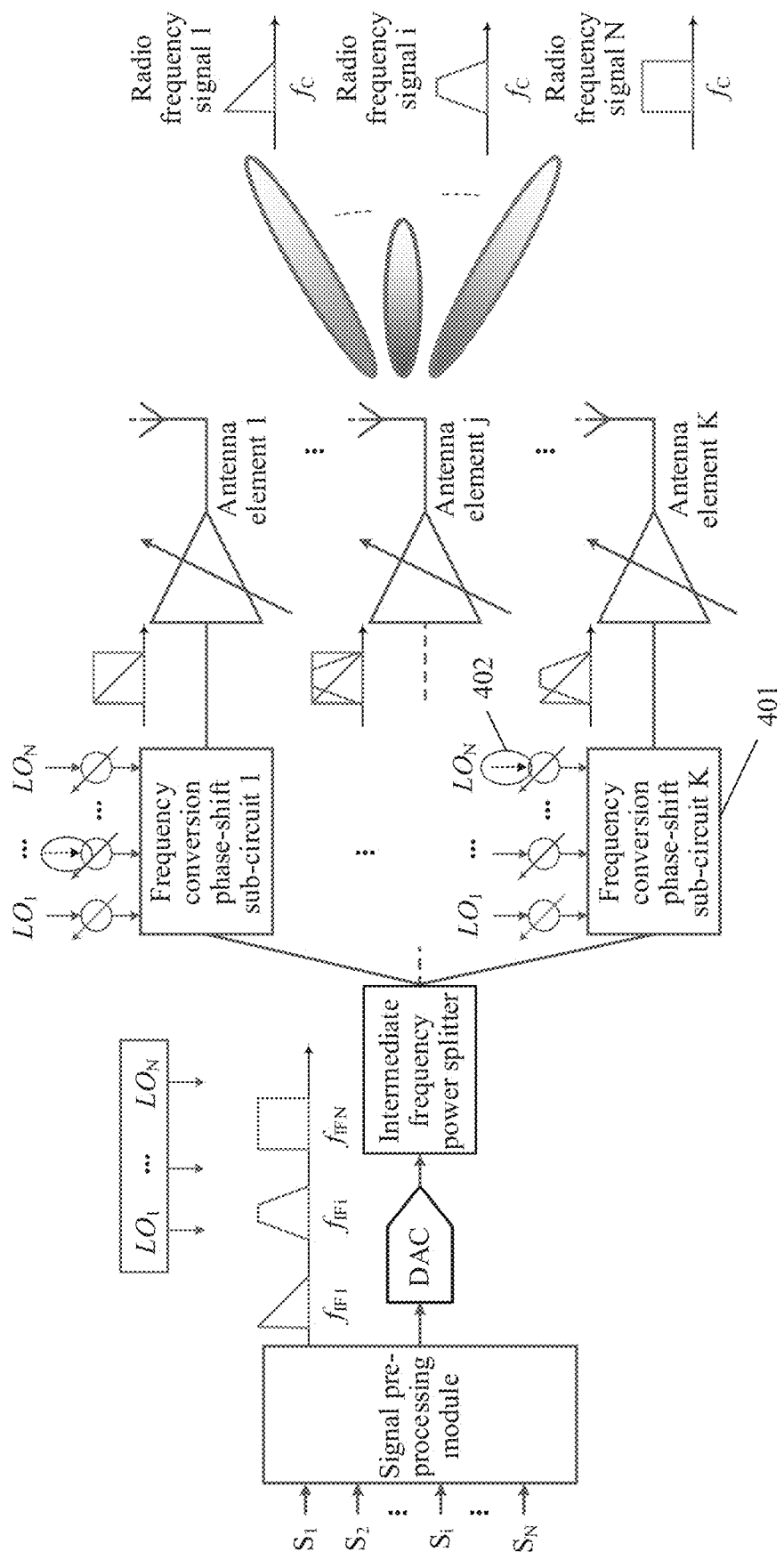
FIG. 4 is a schematic structural diagram of another signal sending circuit according to an embodiment of this application.

FIG. 4 is a schematic structural diagram of another signal sending circuit according to an embodiment of this application. As shown in FIG. 4, on/off of a local oscillator signal in a local oscillator signal group received by each frequency conversion phase-shift sub-circuit in the signal sending circuit may be independently controlled.

Optionally, details may be as follows. Any local oscillator signal in a local oscillator signal group received by any frequency conversion phase-shift sub-circuit is turned off. For example, $LO_N$ in a frequency conversion phase-shift subunit 401 is turned off by using a switch unit 402. In this case, an antenna element K does not send a radio frequency signal corresponding to a signal $S_N$ in a transmission direction, and a $K^{th}$ radio frequency channel does not output, in a receiving direction, a signal whose intermediate frequency is $f_{IFN}$. On/off of each local oscillator signal is controlled, so that dynamic mapping between a to-be-sent/to-be-received signal and an antenna array element can be implemented, thereby improving flexibility of the signal sending circuit.

Figure 5:
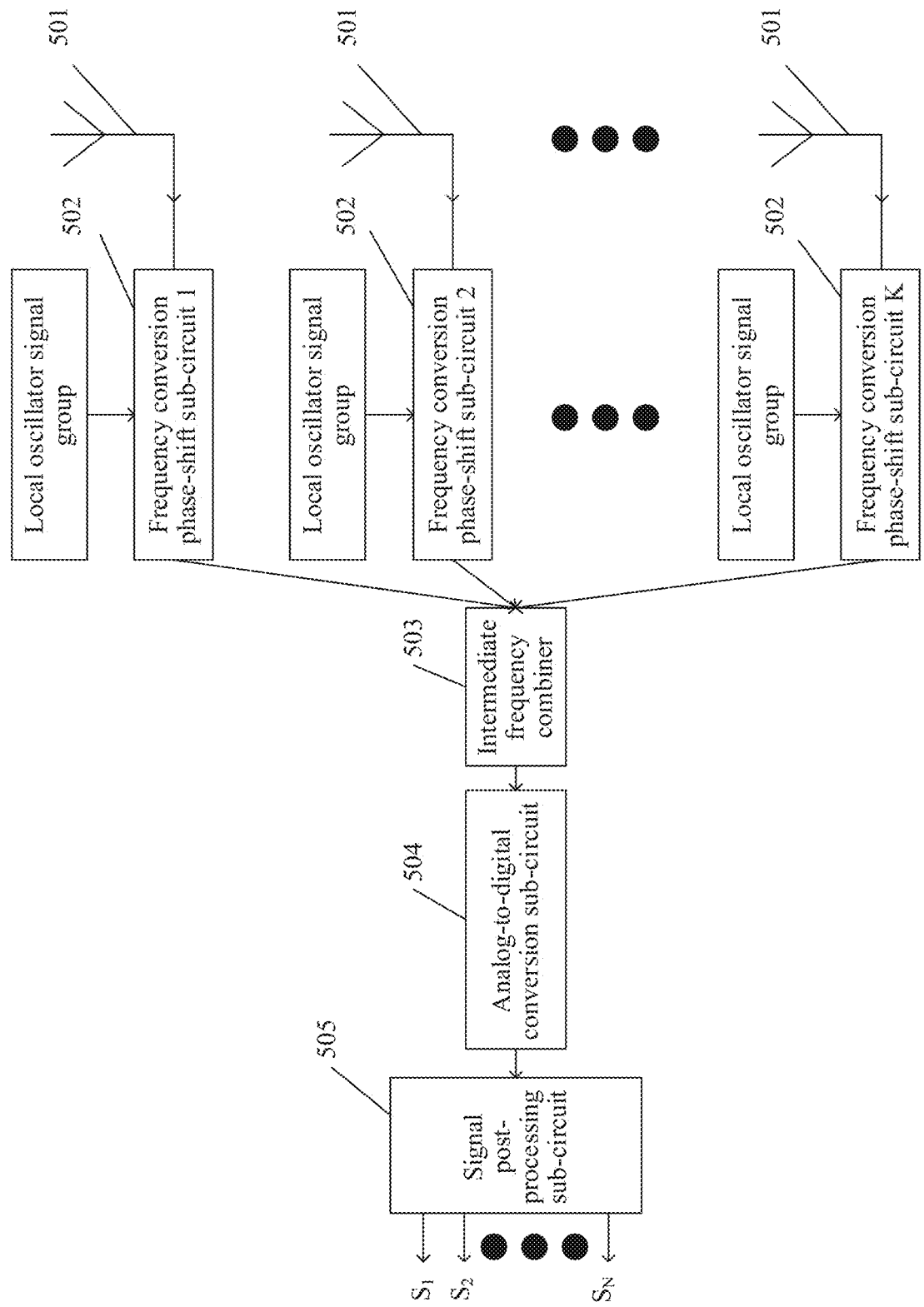
FIG. 5 is a schematic structural diagram of a signal receiving circuit according to an embodiment of this application.

FIG. 5 is a schematic structural diagram of a signal receiving circuit according to an embodiment of this application. As shown in FIG. 5, the signal receiving circuit includes a signal post-processing sub-circuit 505, an analog-to-digital conversion sub-circuit 504, an intermediate frequency combiner 503, K frequency conversion phase-shift sub-circuits 502, and K antenna elements 501, where output ends of the K antenna elements 501 are connected one-to-one to input ends of the K frequency conversion phase-shill sub-circuits 502, output ends of the K frequency conversion phase-shift sub-circuits 502 are all connected to an input end of the intermediate frequency combiner 503, an output end of the intermediate frequency combiner 503 is connected to an input end of the analog-to-digital conversion sub-circuit 504, an output end of the analog-to-digital conversion sub-circuit 504 is connected to an input end of the signal post-processing sub-circuit 505, and K is a positive integer.

An antenna element i in the K antenna elements 501 is configured to receive N radio frequency signals, and send the N radio frequency signals to a frequency conversion phase-shift sub-circuit i, where the antenna element i is any one of the K antenna elements, the frequency conversion phase-shift sub-circuit i is a frequency conversion phase-shift sub-circuit correspondingly connected to the antenna element i, and N and i are positive integers.

The frequency conversion phase-shift sub-circuit i is configured to: receive a local oscillator signal group, perform frequency conversion on the received N radio frequency signals by using a preset frequency conversion and phase shift method, a target phase weighted value set, and the local oscillator signal group to obtain N third analog intermediate frequency signals, and send the N third analog intermediate frequency signals to the intermediate frequency combiner 503.

The intermediate frequency combiner 503 is configured to combine N third analog intermediate frequency signals sent by each frequency conversion phase-shift sub-circuit to obtain one fourth analog intermediate frequency signal, and send the fourth analog intermediate frequency signal to the analog-to-digital conversion sub-circuit 504.

The analog-to-digital conversion sub-circuit 504 is configured to perform analog-to-digital conversion on the fourth analog intermediate frequency signal to obtain one first digital intermediate frequency signal, and send the first digital intermediate frequency signal to the signal post-processing sub-circuit 505.

The signal post-processing sub-circuit 505 is configured to perform filtering on the first digital intermediate frequency signal to obtain N second digital intermediate frequency signals, perform frequency conversion on the N second digital intermediate frequency signals to obtain N low-frequency signals, and output the N low-frequency signals.

In a possible embodiment, the analog-to-digital conversion sub-circuit 504 includes one digital-to-analog converter (Analog-to-Digital Converter, ADC).

Alternatively, the analog-to-digital conversion sub-circuit includes H ADCs and a splitter, input ends of the H ADCs are all connected to the input end of the analog-to-digital conversion sub-circuit, output ends of the HI ADCs are all connected to an input end of the splitter, an output end of the splitter is the output end of the analog-to-digital conversion sub-circuit, and H is a positive integer greater than 1 and less than or equal to N.

In this example, the digital-to-analog conversion sub-circuit includes one ADC or H ADCs. That is, a quantity of the ADCs may be less than a quantity N of independent beams. Compared with an existing solution in which a quantity of ADCs can only be greater than or equal to a quantity of independent beams, this solution in this embodiment can reduce costs of a communication system to some extent. If one ADC is used, at least N−1 ADCs are reduced in the communication system, so that costs of the at least N−1 ADCs are reduced. In this way, an effect in cost reduction is best achieved.

In a possible embodiment, the target phase weighted value set includes N phase weighted values, the local oscillator signal group includes N local oscillator signals. When performing frequency conversion on the received N radio frequency signals, the frequency conversion phase-shift sub-circuit 502 may use the following method for processing. The method includes steps E1 and E2 that are specifically as follows:

E1. Perform phase weighting on the N local oscillator signals in the local oscillator signal group by using the N phase weighted values to obtain a weighted local oscillator signal group, where the N phase weighted values correspond one-to-one to the N local oscillator signals.

E2. Perform down conversion on the N radio frequency signals by using the weighted local oscillator signal group, to obtain the N third analog intermediate frequency signals.

The target phase weighted value set includes the N phase weighted values, and the N phase weighted values correspond one-to-one to the N local oscillator signals. For a weighting method, refer to the phase weighting method in the foregoing circuit. Details are not described herein again.

When down conversion is performed on the N radio frequency signals, the following formula needs to be satisfied: Frequency of the third analog intermediate frequency signal +/− Frequency of a weighted local oscillator signal=Frequency of a second intermediate frequency signal. A down conversion process may be understood as a process of performing down conversion on a received signal to obtain a baseband signal.

In a possible embodiment, the frequency conversion phase-shift sub-circuit 502 includes a frequency mixer and a switch circuit, and the switch circuit is configured to control connection and disconnection of an input port of the frequency mixer.

Figure 6:
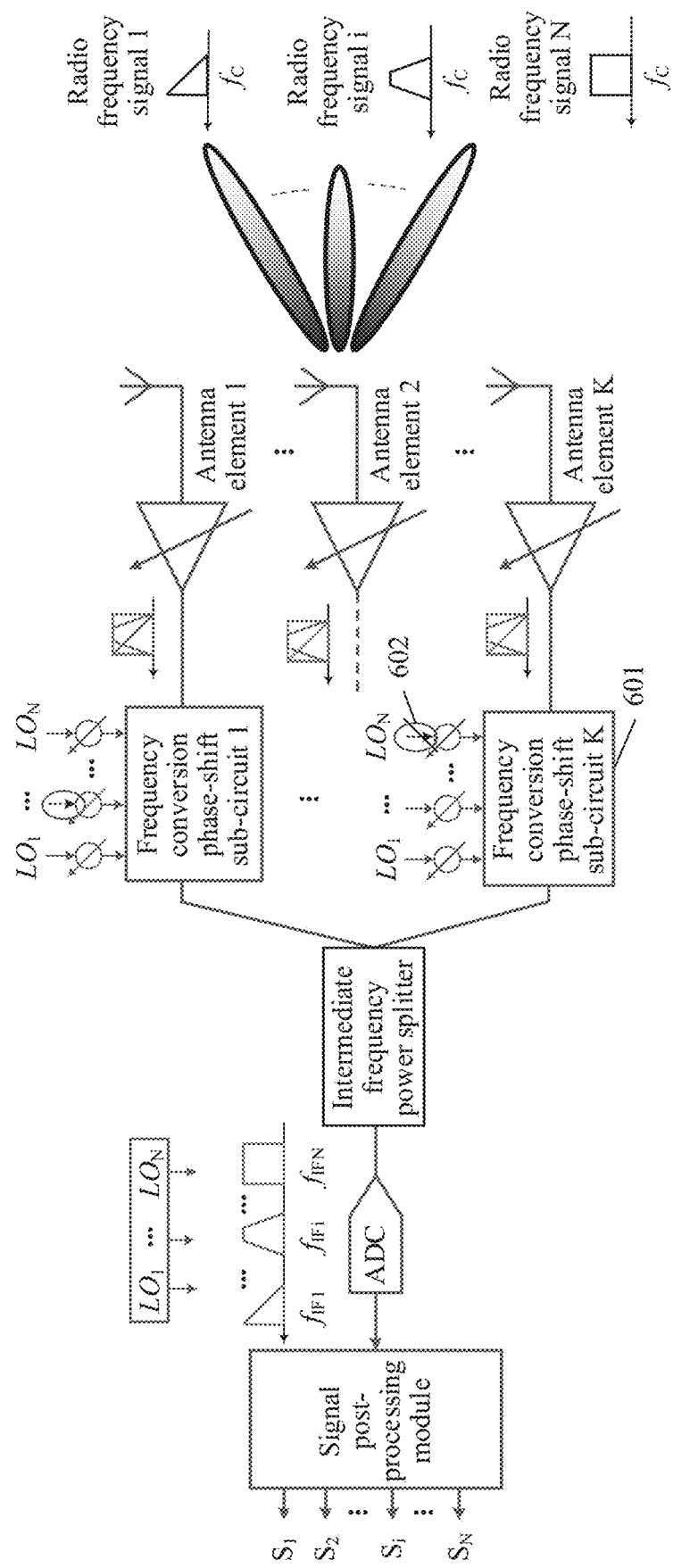
FIG. 6 is a schematic structural diagram of another signal receiving circuit according to an embodiment of this application.

FIG. 6 is a schematic structural diagram of another signal receiving circuit according to an embodiment of this application. As shown in FIG. 6, on/off of a local oscillator signal in a local oscillator signal group received by each frequency conversion phase-shift sub-circuit in the signal receiving circuit may be independently controlled.

Optionally, details may be as follows: Any local oscillator signal in a local oscillator signal group received by any frequency conversion phase-shift sub-circuit is turned off. For example, $LO_N$ in a frequency conversion phase-shift sub-circuit 601 is turned off by using a switch unit 602. In this case, the frequency conversion phase-shift sub-circuit 601 does not output an analog intermediate frequency signal $S_N$ ($f_{IFN}$) corresponding to $LO_N$. On/off of each local oscillator signal is controlled, so that dynamic mapping between a to-be-sent/to-be-received signal and an antenna array element can be implemented, thereby improving flexibility of a signal sending circuit.

Figure 7A:
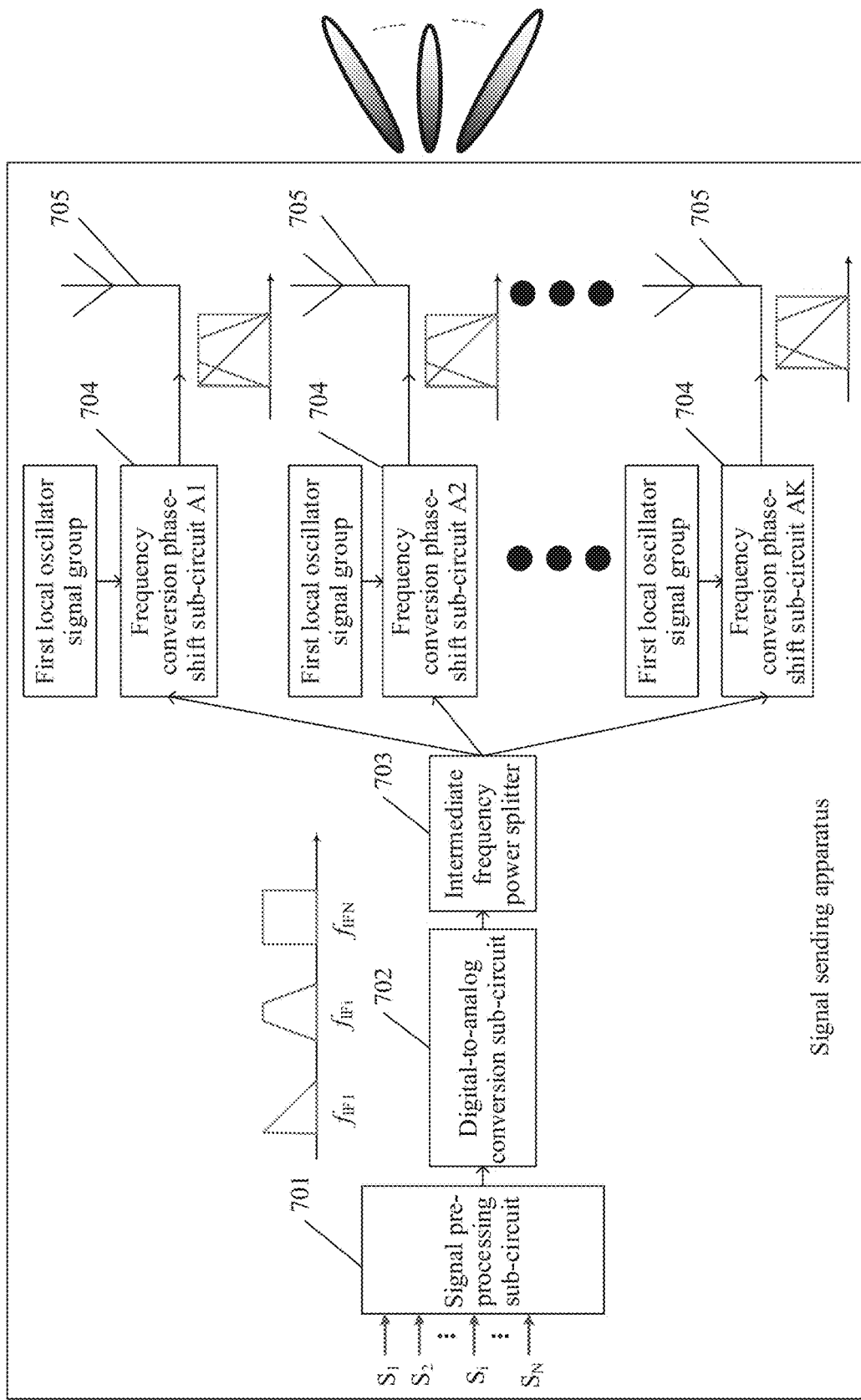
FIG. 7A, FIG. 7B, and FIG. 7C are a schematic structural diagram of a communication system according to an embodiment of this application.
Figure 7B:
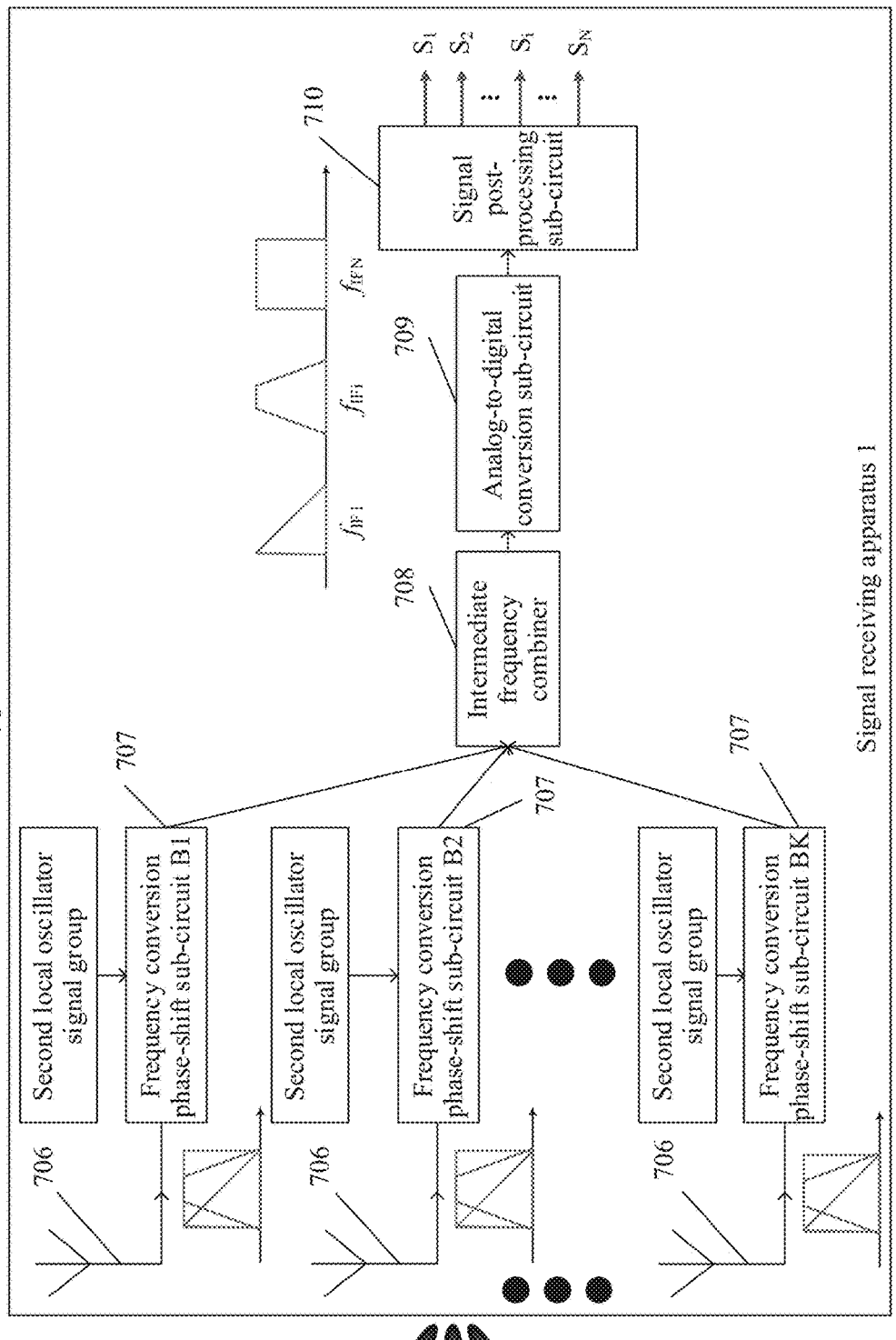
Figure 7C:
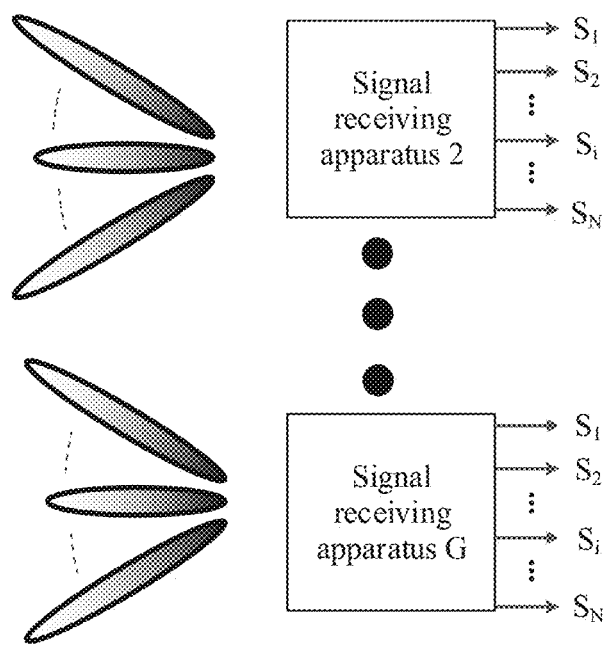

FIG. 7A, FIG. 7B, and FIG. 7C are a schematic structural diagram of a communication system according to an embodiment of this application. As shown in FIG. 7A, FIG. 7B, and FIG. 7C, the communication system may include a signal sending apparatus and a plurality of signal receiving apparatuses. A possible signal sending and receiving procedure between the signal sending apparatus and the signal receiving apparatus is as follows: Using the signal sending apparatus and a signal receiving apparatus 1 as an example herein for description, a signal pre-processing sub-circuit 701 receives N to-be-sent signals $S_1$, $S_2$, ..., and $S_N$, performs frequency conversion on the signals $S_1$, $S_2$, ..., and $S_N$ to obtain N digital intermediate frequency signals $S_{IF1}$, $S_{IF2}$, ..., and $S_{IFN}$, and sends the signals $S_{IF1}$, $S_{IF2}$, ..., and $S_{IFN}$ to a digital-to-analog conversion sub-circuit 702. The digital-to-analog conversion sub-circuit 702 performs conversion on $S_{IF1}$, $S_{IF2}$, ..., and $S_{IFN}$ to obtain one first analog intermediate frequency signal s1, and sends the first analog intermediate frequency signal s1 to an intermediate frequency power splitter 703. The intermediate frequency power splitter 703 splits the first analog intermediate frequency signal s1 to obtain K second analog intermediate frequency signals s2, and sends the K second analog intermediate frequency signals s2 to K frequency conversion phase-shift sub-circuits 704. Each frequency conversion phase-shift sub-circuit in the K frequency conversion phase-shift sub-circuits 704 receives a local oscillator signal group, performs frequency conversion and phase shift on received s2 based on a phase weighted value set, to obtain N radio frequency signals $S_{RF1}$, $S_{RF2}$, ..., and $S_{RFN}$, and sends the signals $S_{RF1}$, $S_{RF2}$, ..., and $S_{RFN}$ to a corresponding antenna element 705. Each antenna element in the K antenna elements 705 sends the received signals $S_{RF1}$, $S_{RF2}$, ..., and $S_{RFN}$. Each antenna element in K antenna elements 706 receives the N radio frequency signals $S_{RF1}$, $S_{RF2}$, ..., and $S_{RFN}$, and sends the signals to a correspondingly connected frequency conversion phase-shift sub-circuit 707. Each of K frequency conversion phase-shift sub-circuits 707 receives a local oscillator signal group, performs frequency conversion on the received signals $S_{RF1}$, $S_{RF2}$, ..., and $S_{RFN}$ based on the phase weighted value set and the local oscillator signal group to obtain N third analog intermediate frequency signals $S_{RFO1}$, $S_{RFO2}$, ..., and $S_{RFON}$, and sends the signals $S_{RFO1}$, $S_{RFO2}$, ..., and $S_{RFON}$ to an intermediate frequency combiner 708. The intermediate frequency combiner 708 combines the signals $S_{RFO1}$, $S_{RFO2}$, ..., and $S_{RFON}$ to obtain one fourth analog intermediate frequency signal s4, and sends the signal s4 to an analog-to-digital conversion sub-circuit 709. The analog-to-digital conversion sub-circuit 709 performs analog-to-digital conversion on the fourth analog intermediate frequency signal s4 to obtain one first digital intermediate frequency signal s5, and sends the signal s5 to a signal post-processing sub-circuit 710. The signal post-processing sub-circuit 710 performs filtering on the first digital intermediate frequency signal s5 to obtain N second digital intermediate frequency signals, performs frequency conversion on the N second digital intermediate frequency signals to obtain N low-frequency signals $S_1, S_2, \ldots,$ and $S_N$, and outputs the signals $S_1, S_2, \ldots,$ and $S_N$. For a signal sending circuit in the signal transmission apparatus in this embodiment, refer to the signal sending circuits in FIG. 1A to FIG. 4. For a signal receiving circuit in the signal receiving apparatus, refer to the signal receiving circuits in FIG. 5 and FIG. 6. Details are not described herein again.

In the communication system, the N to-be-sent signals may be sent by using K antenna array elements, where N may be a positive integer greater than K. In this case, compared with an existing solution in which a quantity of independent beams needs to be less than or equal to a quantity of intermediate radio frequency channels, this solution in this embodiment can implement sending of independent beams whose quantity is greater than a quantity of intermediate radio frequency channels. Therefore, a capacity of the communication system can be improved to some extent.

Figure 8:
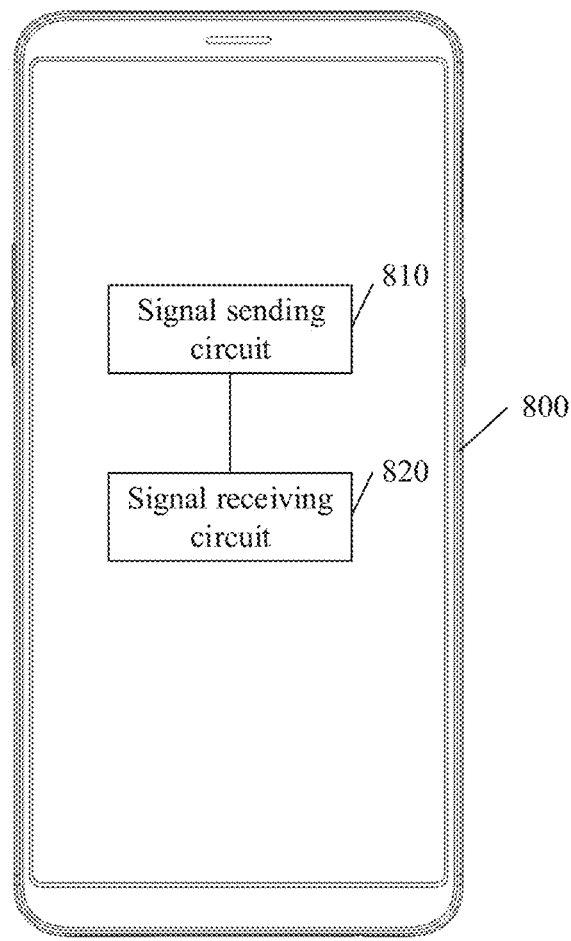
FIG. 8 is a schematic structural diagram of an electronic device according to an embodiment of this application.

FIG. 8 is a schematic structural diagram of an electronic device according to an embodiment of this application. As shown in FIG. 8, the electronic device 800 may include a signal sending circuit 810 and a signal receiving circuit 820. The signal sending circuit 810 may be any one of the signal sending circuits in FIG. 1A to FIG. 4 in the foregoing embodiments. The signal receiving circuit 820 may be the signal receiving circuits shown in FIG. 5 or FIG. 6 in the foregoing embodiments.

Figure 9:
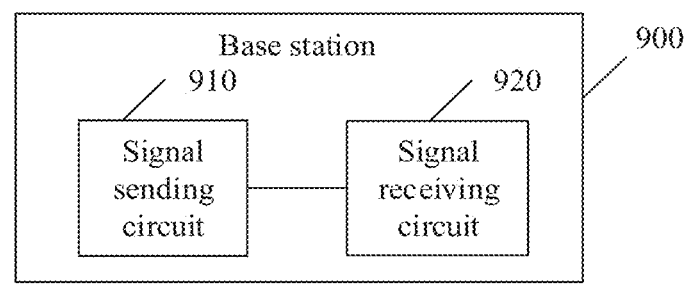
FIG. 9 is a schematic structural diagram of a base station according to an embodiment of this application.

FIG. 9 is a schematic structural diagram of a base station according to an embodiment of this application. As shown in FIG. 9, the base station 900 may include a signal sending circuit 910 and a signal receiving circuit 920. The signal sending circuit 910 may be any one of the signal sending circuits in FIG. 1A to FIG. 4 in the foregoing embodiments. The signal receiving circuit 920 may be the signal receiving circuit shown in FIG. 5 or FIG. 6 in the foregoing embodiments.

It should be noted that, for brief description, the foregoing embodiments are expressed as combinations of a series of actions. However, a person skilled in the art should know that the present invention is not limited to the described action sequence, because according to the present invention, some steps may be performed in another sequence or performed simultaneously. In addition, a person skilled in the art should also know that all the embodiments described in the specification are used as examples, and the related actions and modules are not necessarily mandatory to the present invention.

In the foregoing embodiments, description of each embodiment has respective focuses. For a part that is not described in detail in an embodiment, refer to related description in other embodiments.

In the several embodiments provided in this application, it should be understood that the disclosed apparatus may be implemented in another manner. For example, the described apparatus embodiment is merely an example. For example, division into units is merely division into logical functions and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electrical form or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present invention may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable memory. Based on such an understanding, the technical solutions of the present invention essentially, or the part contributing to the conventional technology, or all or some of the technical solutions may be implemented in the form of a software product. The computer software product is stored in a memory and includes several instructions for instructing a computer device (which may be a personal computer, a server, a network device, or the like) to perform all or some of the steps of the methods described in the embodiments of the present invention. The foregoing memory includes any medium that can store program code, for example, a USB flash drive, a read-only memory (ROM, Read-Only Memory), a random access memory (RAM, Random Access Memory), a removable hard disk, a magnetic disk, or an optical disc.

A person of ordinary skill in the art may understand that all or some of the steps of the methods in the embodiments may be implemented by a program instructing related hardware. The program may be stored in a computer-readable memory. The memory may include a flash memory, a read-only memory (English: Read-Only Memory, ROM for short), a random access memory (English: Random Access Memory, RAM for short), a magnetic disk, an optical disc, or the like.

The embodiments of the present invention are described in detail above. The principle and implementation of the present invention are described in this specification by using specific examples. The description about the embodiments is merely provided to help understand the method and core ideas of the present invention. In addition, a person of ordinary skill in the art makes variations to the present invention in terms of the specific implementations and application scopes based on the ideas of the present invention. Therefore, the content of this specification shall not be construed as a limitation to the present invention.

What is claimed is:

1. A signal sending circuit, wherein the circuit comprises a signal pre-processing sub-circuit, a digital-to-analog conversion sub-circuit, an intermediate frequency power splitter, K frequency conversion phase-shift sub-circuits, and K antenna elements, and wherein an output end of the signal pre-processing sub-circuit is connected to an input end of the digital-to-analog conversion sub-circuit, an output end of the digital-to-analog conversion sub-circuit is connected to an input end of the intermediate frequency power splitter, an output end of the intermediate frequency power splitter is connected to input ends of the K frequency conversion phase-shift sub-circuits, output ends of the K frequency conversion phase-shift sub-circuits are connected one-to-one to input ends of the K antenna elements, and K is a positive integer;

wherein the signal pre-processing sub-circuit is configured to:
  perform frequency conversion on N to-be-sent signals to obtain N digital intermediate frequency signals, wherein N is a positive integer greater than or equal to 2; and
  send the N digital intermediate frequency signals to the digital-to-analog conversion sub-circuit;
wherein the digital-to-analog conversion sub-circuit is configured to:
  perform conversion on the N digital intermediate frequency signals to obtain a single first analog intermediate frequency signal; and
  send the single first analog intermediate frequency signal to the intermediate frequency power splitter;
wherein the intermediate frequency power splitter is configured to:
  split the single first analog intermediate frequency signal into K second analog intermediate frequency signals; and
  separately send the K second analog intermediate frequency signals to the K frequency conversion phase-shift sub-circuits;
wherein a frequency conversion phase-shift sub-circuit i in the K frequency conversion phase-shift sub-circuits is configured to:
  receive a local oscillator signal group;
  perform, by using a target phase weighted value set and the local oscillator signal group, frequency conversion and phase shift on a received second analog intermediate frequency signal to obtain N radio frequency signals; and
  send the N radio frequency signals to an antenna element i, wherein the frequency conversion phase-shift sub-circuit i is any one of the K frequency conversion phase-shift sub-circuits, the antenna element i is an antenna element correspondingly connected to the frequency conversion phase-shift sub-circuit i, and i is a positive integer;
wherein the antenna element i is configured to send the received N radio frequency signals; and
wherein the digital-to-analog conversion sub-circuit comprises one digital-to-analog converter (DAC); or
wherein the digital-to-analog conversion sub-circuit comprises M DACs and a combiner, input ends of the M DACs are all connected to the input end of the digital-to-analog conversion sub-circuit, output ends of the M DACs are all connected to an input end of the combiner, an output end of the combiner is the output end of the digital-to-analog conversion sub-circuit, and M is a positive integer greater than 1 and less than or equal to N.

2. The circuit according to claim 1, wherein the signal pre-processing sub-circuit is configured to:
  perform frequency conversion on the N to-be-sent signals by using a frequency division method to obtain the N digital intermediate frequency signals;
  perform frequency conversion on the N to-be-sent signals by using an orthogonal method to obtain the N digital intermediate frequency signals, wherein N is 2; or
  perform frequency conversion on the N to-be-sent signals by using an orthogonal method and a frequency division method to obtain the N digital intermediate frequency signals.

3. The circuit according to claim 2, wherein the target phase weighted value set comprises N phase weighted values, the local oscillator signal group comprises N local oscillator signals, and the frequency conversion phase-shift sub-circuit is configured to:
  perform phase weighting on the N local oscillator signals in the local oscillator signal group by using the N phase weighted values to obtain a weighted local oscillator signal group, wherein the N phase weighted values correspond one-to-one to the N local oscillator signals; and
  perform frequency mixing on the received second analog intermediate frequency signal by using the weighted local oscillator signal group to obtain the N radio frequency signals.

4. The circuit according to claim 2, wherein the target phase weighted value set comprises two phase weighted values, the local oscillator signal group comprises two local oscillator signals, and the frequency conversion phase-shift sub-circuit is configured to:
  perform phase weighting on N local oscillator signals in the local oscillator signal group by using the two phase weighted values to obtain a weighted local oscillator signal group, wherein the two phase weighted values correspond one-to-one to the two local oscillator signals; and
  perform frequency mixing on the received second analog intermediate frequency signal by using the weighted local oscillator signal group to obtain two radio frequency signals.

5. The circuit according to claim 4, wherein N is a positive even number, and for the performing frequency conversion on the N to-be-sent signals by using an orthogonal method and a frequency division method to obtain the N digital intermediate frequency signals, the signal pre-processing sub-circuit is configured to:
  perform frequency conversion on the N to-be-sent signals by using the frequency division method to obtain N reference digital intermediate frequency signals;
  group the N reference digital intermediate frequency signals in pairs to obtain N/2 signal groups; and
  process the N/2 signal groups by using the orthogonal method to obtain the N digital intermediate frequency signals.

6. The circuit according to claim 5, wherein the target phase weighted value set comprises N phase weighted values, the local oscillator signal group comprises N local oscillator signals, and the frequency conversion phase-shift sub-circuit is configured to:
  perform phase weighting on the N local oscillator signals in the local oscillator signal group by using the N phase weighted values to obtain a weighted local oscillator signal group, wherein the N phase weighted values correspond one-to-one to the N local oscillator signals; and
  perform frequency mixing on the received second analog intermediate frequency signal by using the weighted local oscillator signal group to obtain the N radio frequency signals.

7. The circuit according to claim 1, wherein the frequency conversion phase-shift sub-circuit comprises a frequency mixer and a switch circuit, and the switch circuit is configured to control connection and disconnection of an input port of the frequency mixer.

8. An electronic device, wherein the electronic device comprises a signal sending circuit, wherein the circuit comprises a signal pre-processing sub-circuit, a digital-to-analog conversion sub-circuit, an intermediate frequency power splitter, K frequency conversion phase-shift sub-circuits, and K antenna elements, and wherein an output end of the signal pre-processing sub-circuit is connected to an input end of the digital-to-analog conversion sub-circuit, an output end of the digital-to-analog conversion sub-circuit is connected to an input end of the intermediate frequency power splitter, an output end of the intermediate frequency power splitter is connected to input ends of the K frequency conversion phase-shift sub-circuits, output ends of the K frequency conversion phase-shift sub-circuits are connected one-to-one to input ends of the K antenna elements, and K is a positive integer;

wherein the signal pre-processing sub-circuit is configured to:
perform frequency conversion on N to-be-sent signals to obtain N digital intermediate frequency signals, wherein N is a positive integer greater than or equal to 2; and
send the N digital intermediate frequency signals to the digital-to-analog conversion sub-circuit;

wherein the digital-to-analog conversion sub-circuit is configured to:
perform conversion on the N digital intermediate frequency signals to obtain a single first analog intermediate frequency signal; and
send the single first analog intermediate frequency signal to the intermediate frequency power splitter;

wherein the intermediate frequency power splitter is configured to:
split the single first analog intermediate frequency signal into K second analog intermediate frequency signals; and
separately send the K second analog intermediate frequency signals to the K frequency conversion phase-shift sub-circuits;

wherein a frequency conversion phase-shift sub-circuit i in the K frequency conversion phase-shift sub-circuits is configured to:
receive a local oscillator signal group;
perform, by using a target phase weighted value set and the local oscillator signal group, frequency conversion and phase shift on a received second analog intermediate frequency signal to obtain N radio frequency signals; and
send the N radio frequency signals to an antenna element i, wherein the frequency conversion phase-shift sub-circuit i is any one of the K frequency conversion phase-shift sub-circuits, the antenna element i is an antenna element correspondingly connected to the frequency conversion phase-shift sub-circuit i, and i is a positive integer;

wherein the antenna element i is configured to send the received N radio frequency signals; and wherein the digital-to-analog conversion sub-circuit comprises one digital-to-analog converter (DAC); or wherein the digital-to-analog conversion sub-circuit comprises M DACs and a combiner, input ends of the M DACs are all connected to the input end of the digital-to-analog conversion sub-circuit, output ends of the M DACs are all connected to an input end of the combiner, an output end of the combiner is the output end of the digital-to-analog conversion sub-circuit, and M is a positive integer greater than 1 and less than or equal to N.

9. The electronic device according to claim 8, wherein the signal pre-processing sub-circuit is configured to:
perform frequency conversion on the N to-be-sent signals by using a frequency division method to obtain the N digital intermediate frequency signals;
perform frequency conversion on the N to-be-sent signals by using an orthogonal method to obtain the N digital intermediate frequency signals, wherein N is 2; or
perform frequency conversion on the N to-be-sent signals by using an orthogonal method and a frequency division method to obtain the N digital intermediate frequency signals.

10. The electronic device according to claim 9, wherein the target phase weighted value set comprises N phase weighted values, the local oscillator signal group comprises N local oscillator signals, and the frequency conversion phase-shift sub-circuit is configured to:
perform phase weighting on the N local oscillator signals in the local oscillator signal group by using the N phase weighted values to obtain a weighted local oscillator signal group, wherein the N phase weighted values correspond one-to-one to the N local oscillator signals; and
perform frequency mixing on the received second analog intermediate frequency signal by using the weighted local oscillator signal group to obtain the N radio frequency signals.

11. The electronic device according to claim 9, wherein the target phase weighted value set comprises two phase weighted values, the local oscillator signal group comprises two local oscillator signals, and the frequency conversion phase-shift sub-circuit is configured to:
perform phase weighting on N local oscillator signals in the local oscillator signal group by using the two phase weighted values to obtain a weighted local oscillator signal group, wherein the two phase weighted values correspond one-to-one to the two local oscillator signals; and
perform frequency mixing on the received second analog intermediate frequency signal by using the weighted local oscillator signal group to obtain two radio frequency signals.

12. The electronic device according to claim 11, wherein N is a positive even number, and for the performing frequency conversion on the N to-be-sent signals by using an orthogonal method and a frequency division method to obtain the N digital intermediate frequency signals, the signal pre-processing sub-circuit is configured to:
perform frequency conversion on the N to-be-sent signals by using the frequency division method to obtain N reference digital intermediate frequency signals;
group the N reference digital intermediate frequency signals in pairs to obtain N/2 signal groups; and
process the N/2 signal groups by using the orthogonal method to obtain the N digital intermediate frequency signals.

13. The electronic device according to claim 12, wherein the target phase weighted value set comprises N phase weighted values, the local oscillator signal group comprises N local oscillator signals, and the frequency conversion phase-shift sub-circuit is configured to:
perform phase weighting on the N local oscillator signals in the local oscillator signal group by using the N phase weighted values to obtain a weighted local oscillator signal group, wherein the N phase weighted values correspond one-to-one to the N local oscillator signals; and perform frequency mixing on the received second analog intermediate frequency signal by using the weighted local oscillator signal group to obtain the N radio frequency signals.

14. The electronic device according to claim 8, wherein the frequency conversion phase-shift sub-circuit comprises a frequency mixer and a switch circuit, and the switch circuit is configured to control connection and disconnection of an input port of the frequency mixer.

* * * * *